May 3, 1927.
L. KRAEMER
1,627,514
LINE DRYING ATTACHMENT FOR FISHING RODS
Filed Oct. 16, 1926
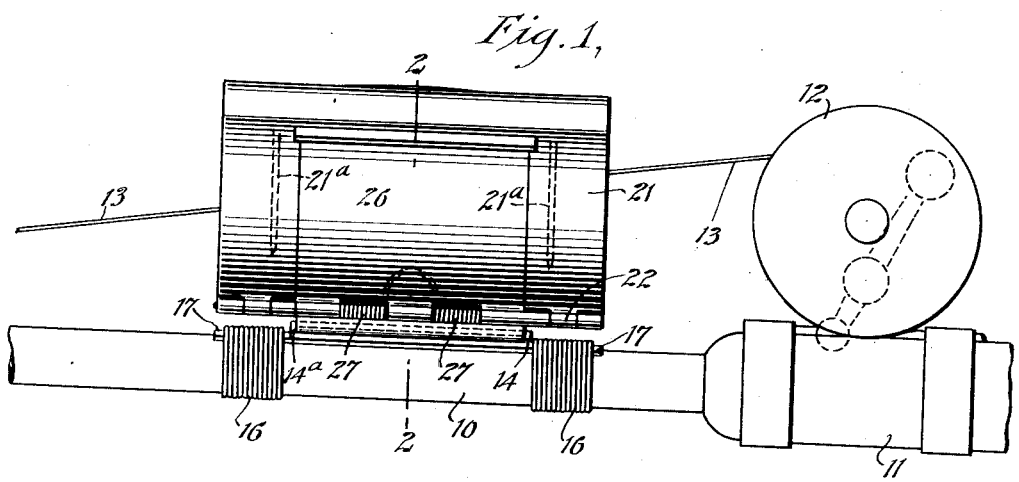
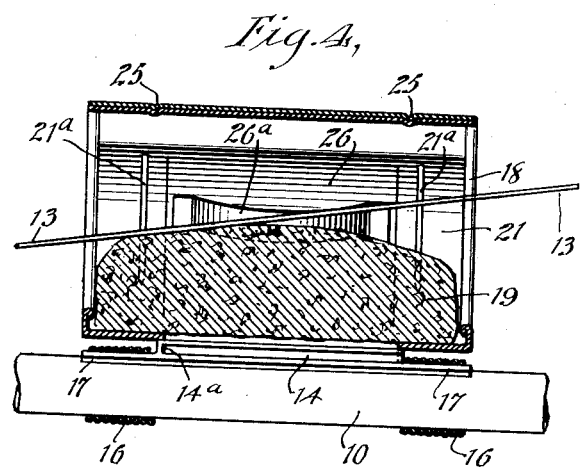
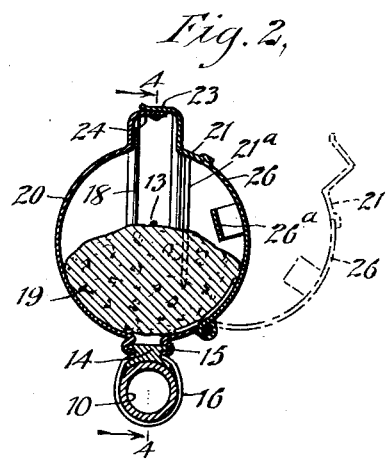
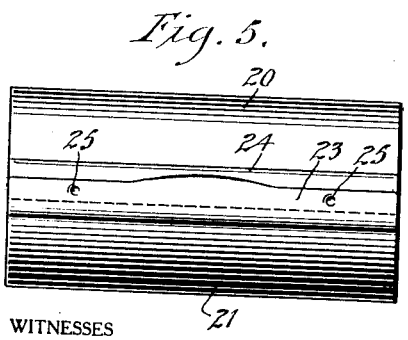
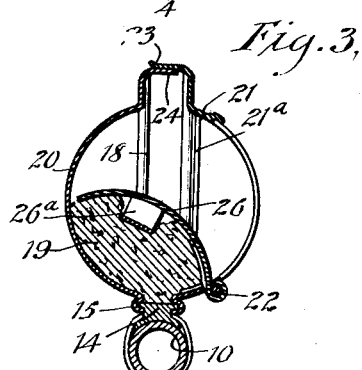
WITNESSES
Edw. Thorpe
Franklin F. Foster
INVENTOR
Louis Kraemer
BY Munn & Co.
ATTORNEYS Patented May 3, 1927.

1,627,514

UNITED STATES PATENT OFFICE.

LOUIS KRAEMER, OF YONKERS, NEW YORK.

LINE-DRYING ATTACHMENT FOR FISHING RODS.

Application filed October 16, 1926. Serial No. 142,043.

The present invention is concerned with the provision of an attachment for fishing rods or poles adapted to serve the purpose of drying the line as it is reeled in, so that the fisherman will not be subject to the inconvenience of having water from the wet line drip over his hands and clothing.

An object of the invention is to provide a device of this character, capable of convenient and expeditious attachment to or detachment from a rod, and which will in no way interfere with the usual operations of casting and reeling.

Other objects of the invention are to provide a device of this nature which may be rapidly reversed on the pole for the convenience of right handed or left handed fishermen.

Other objects of the invention are to provide a line-drying attachment of extremely simple, practical construction, which will be rugged, durable and efficient in use, light in weight, easy to handle, and well suited to the requirements of economical manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a fragmentary view in side elevation showing the device of the present invention attached to a fishing rod.

Fig. 2 is a transverse sectional view on the line 2—2 of Fig. 1, the dotted lines indicating the hinge section of the casing swung open to permit the insertion or removal of the sponge.

Fig. 3 is a view similar to Fig. 2, but showing the presser plate swung inwardly to squeeze the sponge and force the water therefrom.

Fig. 4 is a longitudinal sectional view substantially on the line 4—4 of Fig. 2.

Fig. 5 is a top plan view of the attachment.

In the drawings I have used the numeral 10 to designate a fishing rod or pole attached to a handle 11, upon which may be mounted any ordinary type of reel 12, upon which is wound the line 13. The device of the present invention is adapted to be secured upon the rod and to direct the line 13 as it is reeled in over a sponge, so that the line is substantially dry before reaching the reel and there is no danger of dripping water over the hands or clothing of the fisherman.

Means is provided on the rod for the reception of the attachment, this means being preferably in the nature of a key 14 adapted to enter a channel 15 forming part of the sponge-carrying housing. The key 14 may be welded to the rod, soldered thereto, clamped thereon, cast integral therewith, or secured in place by the simple expedient of whipping cords 16 around the projecting ends 17 of the key.

The sponge-carrying attachment includes a housing in which the sponge is received. This housing may be of any desired cross sectional shape, and for illustrative purposes only, I have shown it as comprising a substantially cylindrical element, from which the channel forming flanges 15 are struck. Flanges 15 abut a stop 14ª on key 14 to prevent the housing from slipping off its key.

At each end of the housing, a pair of wires or frame members 18 are provided which form guides for the line 13, the line passing through the two sets of guides and over the sponge 19 which rests on the bottom of the housing. The cylindrical housing member includes a stationary section 20 from which the flanges 15 are struck, and a swinging section 21 pivotally connected as by hinges 22 to the stationary section. The flanged free edge 23 of the swinging section 21 is adapted to snap over an offset flange 24 at the edge of the stationary section, and carries locking tits 25 snapping into recesses in the stationary section.

A plate portion 26 of the swinging section 21 is adapted to be manually forced inwardly and to act as a presser plate to compress the sponge 19 and extract the water therefrom. The curved presser plate 26 is also pivoted on the hinge 22 and is acted upon by coiled torsional springs 27 to retain it normally in the position of Fig. 2. The device may be manually moved inwardly to the position of Fig. 3 when it is desired to extract the water from the sponge.

From the foregoing description it will be apparent that the position of the sponge-carrying attachment may be reversed at will by simply slipping it off its key, reversing it and sliding it on the key again. Thus, the presser plate will be in convenient position for manipulation by either left handed or right handed fishermen. The line is drawn across the sponge as it is reeled in. The device in no way interferes with the ordinary operations of casting or reeling in.

In order to more effectively squeeze the sponge when the presser plate 26 is swung inwardly, this plate may carry on its inner face, an offset presser bar 26ª which engages the sponge. Movement of the sponge under the influence of the line, or independently of the housing is prevented by the use of pins 21ª carried by housing section 21, and penetrating the sponge as the housing section is swung to closed position.

Obviously various changes and alterations may be made both in the construction of the device and in the manner of attaching it to the rod, without departing from the spirit and scope of the appended claims.

I claim:

1. An attachment for fishing rods including a housing formed of two sections, one pivoted relatively to the other, means for guiding a line through the housing and a sponge in the housing over which the line is adapted to be drawn as it is reeled in, the guiding means including pairs of spaced guide wires between which the line runs.

2. An attachment for fishing rods including a housing formed of two sections, one pivoted relatively to the other, means for guiding a line through the housing and a sponge in the housing over which the line is adapted to be drawn as it is reeled in, a hinged presser plate forming part of one of the housing sections and adapted to be manually forced inwardly to compress the sponge.

3. An attachment for fishing rods including a housing formed of two sections, one pivoted relatively to the other, means for guiding a line through the housing and a sponge in the housing over which the line is adapted to be drawn as it is reeled in, a hinged presser plate forming part of one of the housing sections and adapted to be manually forced inwardly to compress the sponge, and an offset presser bar element carried by the inside of the presser plate.

4. An attachment for fishing rods including a housing formed of two sections, one pivoted relatively to the other, means for guiding a line through the housing and a sponge in the housing over which the line is adapted to be drawn as it is reeled in, and pins carried by one of the sections for impaling the sponge and holding it against shifting movement.

5. An attachment for fishing rods including a housing formed of two sections, one pivoted relatively to the other, means for guiding a line through the housing and a sponge in the housing over which the line is adapted to be drawn as it is reeled in, one section of the housing including a channelled portion adapted to slide over a key on a fishing rod, the other section being hinged relatively to the first one, and snapping into locking engagement therewith, at its free edge.

6. A device of the class described in claim 2, and including a spring normally holding a presser plate out of operative position.

7. The combination with a fishing rod and a key rigid therewith, of a sponge-holding attachment including a channelled member sliding over the key.

8. The combination with a fishing rod and a key rigid therewith, of a sponge-holding attachment including a channelled member sliding over the key, said key having a stop to limit the sliding movement of the attachment.

LOUIS KRAEMER.